United States Patent [19]

Hsu et al.

[11] Patent Number: 4,822,440

[45] Date of Patent: Apr. 18, 1989

[54] CROSSBAND AND CROSSBANDING

[75] Inventors: Ten-hu Hsu; Watson F. Brown; Jerry J. Saimre, all of Wilmington, Del.

[73] Assignee: NVF Company, Yorklyn, Del.

[21] Appl. No.: 116,578

[22] Filed: Nov. 4, 1987

[51] Int. Cl.$^4$ ................................................. C09J 5/02
[52] U.S. Cl. ................................. 156/307.5; 144/348; 144/352; 156/76; 156/264; 156/313; 156/315; 156/324; 427/208; 428/349; 428/527; 428/530
[58] Field of Search ...................... 427/208; 156/307.5, 156/313, 315, 264, 76, 280, 324; 428/503, 512, 530, 349, 527; 144/348, 352; 52/785; 8/119

[56] References Cited

U.S. PATENT DOCUMENTS

| | | | |
|---|---|---|---|
| 1,299,747 | 4/1919 | McClain | 156/313 |
| 3,502,533 | 3/1970 | Reiss | 156/315 |
| 3,677,868 | 7/1972 | Boggs | 156/315 |
| 3,816,236 | 6/1974 | Baymiller | 156/313 |
| 4,466,847 | 8/1984 | Held | 156/324 |

*Primary Examiner*—John J. Gallagher
*Attorney, Agent, or Firm*—Connolly & Hutz

[57] ABSTRACT

Crossbanding of veneered or laminated panels with vulcanized fiber sheets that can be of multiple thin plies vulcanized together and colored. The finished vulcanized fiber crossband sheets have both surfaces coated with adhesive adherently dried in place so that they can be very simply assembled with the remaining panel constituents and hot pressed to produce desired panel.

10 Claims, 1 Drawing Sheet

U.S. Patent        Apr. 18, 1989        4,822,440

CROSSBAND AND CROSSBANDING

The present invention relates to the hot pressing of layers of natural or reconstituted wood products, as in the manufacture of pressed wood panels for furniture making.

Crossbands have been used in multi-ply panels to prevent checking and splitting of face veneers as well as to mask joints, texture, and imperfections of the core stock. The furniture industry has been using vulcanized fiber crossbands, on which liquid adhesive is applied just before the pressing. During the pressing, which can be hot or cold, the liquid adhesive converts to its hardened or C stage and molds the crossbands into place.

Among the objects of the present invention is the provision of an improved crossbanding technique as well as improved crossband sheets for use in such technique.

Figure 1:
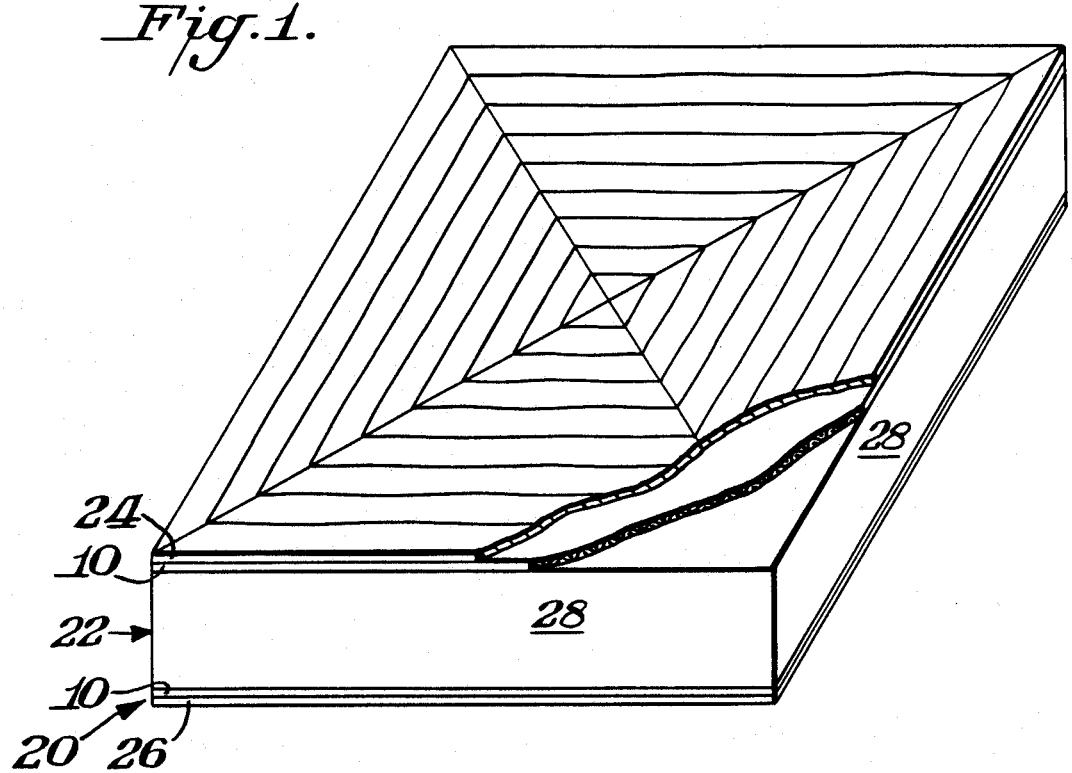
Figure 2:
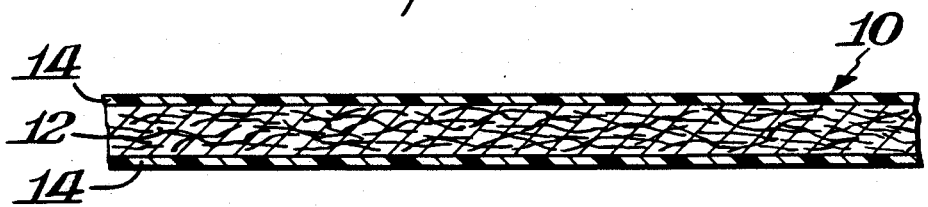

The foregoing as well as additional objects of the present invention will be more fully understood from the following description of several of its exemplifications, reference being made to the accompanying drawings in which:

FIG. 1 is an isometric view, partly broken away, of a fancy face 5-ply panel made according to the present invention; and FIG. 2 is an enlarged sectional view of a crossband sheet used to make the product of FIG. 1.

Vulcanized cellulose fiber paper, generally called vulcanized fiber, is admirably suited as a crossband material for wood panelling. Such a crossband has extremely high tensile strength in all directions so that a thin crossband of such material can be used to securely anchor wooden sheets or veneers in place. Moreover its cellulosic nature is highly compatible with wood so that splitting and checking of the face veneers are eliminated. However it is essentially non-porous, particularly when loaded with pigment, so that it will not absorb adhesive the way porous molding papers do.

Vulcanized fiber crossbands can vary in thickness from about 10 mils to about 30 mils, and preferably are colored with pigments to match the colors of face veneers. Also these crossbands can be laminated from about 2 to about 6 very thin plies. The pigments are conveniently added to the beater stock from which the plies are sheeted, and no more than about ½ to about 2% pigment need be used, based on the dry weight of the fiber.

The papers used for making vulcanized fiber crossbands are formed on fourdrinier machines from 100% Kraft or sulfite pulp. Each ply preferably contains about 3 to about 4 ounces of fiber per square yard, based on the dry weight of the fiber.

The sheeted plies are dried to a moisture content of about 2 to about 4%, then superimposed and fed in superimposed condition through the vulcanizing tank and then through the purification tanks, followed by drying. The vulcanizing treatment causes the superimposed plies to adhere to each other, and after the drying they will not delaminate. The purification tanks wash the vulcanizing material from the sheets, and need not be as exhaustive as the washing used to prepare electrical grade vulcanized fiber.

The laminate can then be calendered to assure uniform thickness and smooth surface.

The resulting laminate is then passed through a roll coater in which both its faces are coated with adhesive. An aqueous dispersion of melamine-formaldehyde condensation resins that are still water-soluble makes a very good coating at coating weights on each surface of from about 10 to about 20 pounds of dry resin per 1000 square feet. The thus-coated laminate is now dried preferably at an elevated temperature not high enough to permanently set the adhesive but high enough to dry the adhesive to B stage. For melamine-formaldehyde resins, maximum temperature of about 220° to 230° F. is preferred.

During the drying, the web carrying the liquid adhesive is supported in such a way as to minimize any effect of the support on the adhesive. Thus the web is preferably held in a generally horizontal plane by a series of horizontal bars extending transversely and about 8 to about 12 feet apart, with each bar engaging not more than a one-inch length of the wet under-surface of the web.

The bars can be held by their ends on conveyors that carry them and a continuously advancing web on them, through an air oven so that at the conclusion of the drying the web has a dry solid adhesive coating on each face, marred only at the locations where it had been supported by the bars. By shaping the bars so that each engages only about ⅛ inch or less of the web as measured in the direction the web moves, the marring will be insignificant even if the supporting bars are only 6 feet apart.

The coated and dried web can be wound upon a roll having a core as small as about 3 inches in diameter, even when the vulcanized fiber sheet is as thick as 30 mils. There is no blocking effect of the dried adhesive layers between successive turns of the roll and such a wound up roll can be stored for at least six months if kept below 120° F.

The vulcanized fiber web can also be wound on such a roll before it is coated. At that stage the web can be dry, that is have a moisture content of about 6–7%. Even though the dried web is immediately coated with an aqueous mixture, it is essential to first complete the web drying to about 6 to 7% moisture content. The liquid adhesive can be sprayed onto the web surfaces instead of having the web carried through a body of liquid adhesive in a roll-coater trough for example. If desired the freshly dried vulcanized fiber web can be fed directly to the coater to save coiling up and uncoiling, and to also utilize the heat content of the dried web.

The coated and dried web can be shipped to locations where it is to be used as crossband material. Such web is illustrated at 10 in FIG. 2, greatly enlarged. Here a laminated vulcanized fiber sheet 12 adherently carries on each of its faces a dried adhesive layer 14. The coated sheet is cut to the expected size required for crossbanding a panel as illustrated at 20 in FIG. 1. Panel 20 consists of a particleboard core 22 assembled with a crossband sheet 10 on each surface and with face sheets 24, 26 over each crossband sheet. One of the face sheets, for example, is generally a specially decorative wood veneer sheet shown in FIG. 1 as being impressed with a diamond-shaped pattern. The other face sheet 26 can also be decorative or merely a plain sheet of veneer.

The assembled items are then pressed between plates heated to about 275° F. and a pressure of about 150 pounds per square inch. The heat penetrates into the assembly to cure the adhesive layers 14 on the crossband sheets after a few minutes, when the face sheets are no thicker than about 30 mils.

After sufficient time has elapsed, the press is opened and the cured panel is removed. The edge faces 28 of the cured panel can then be edge-banded by cementing to them decorative or other face strips. Strips of a crossband sheet can be used for this purpose with the help of standard adhesives such as ethylene-vinyl acetate and polyamide hot melt adhesives used for edgebanding. Cold-setting adhesives such as the usual urea-formaldehyde and polyvinyl acetate adhesives can also be used for this purpose as well as for crossbanding if desired.

The core 22 of FIG. 1 is shown as a single piece as large as the panel, but it can be assembled from two or more pieces preferably cemented together as needed to make up the desired length and width. A particularly desirable arrangement has a particleboard core surrounded on its four edges with one or one-half inch wide strips of solid wood and this is crossbanded without requiring edge-banding.

Where the face panels 24 and/or 26 are thicker than about 40 mils, the press curing takes a longer time, particularly if the crossband sheet is about 30 mils thick. However after the curing is completed, regardless of the specific dimensions, there results a surface-finished panel that presents an attractive appearance that hides all joints, texture and imperfections in the core and shows no surface cracking or splitting in spite of sizeable and prolonged changes in humidity and temperature. The hot pressing itself causes extremely large humidity and temperature variations.

While vulcanized fiber sheets had been used in the prior art, they were coated with liquid adhesive just before the hot pressing, and frequently cut a little oversize in order to hold any adhesive squeezed out during the hot pressing. The extra projection was then trimmed off. That extra waste is not needed according to the present invention.

EXAMPLE

Disperse 100 parts by weight of American Cyanamid Company Cymel 412 resin, a plasticized A-staged melamineformaldehyde condensate, in 50 parts by weight of warm water (140°-160° F.). Add 3 parts by weight of n-butanol and 1.5 parts by weight of halide catalyst to above mixture. After thorough mixing, transfer the resulting liquid mixture to the coating trough of a two-roll roll coater. Adjust the nip between the two rolls so that a coat weight of 15 lbs. of dry resin/1000 ft.$^2$ will be coated on each face of elongated 15 mil thick vulcanized fiber sheet. That sheet is fed from a supply roll to the coater and is then immediately sent through an air oven set at 220°-230° F. at a speed of 16 ft/min. on a bar conveyor in which the bars are ten feet apart. After about six minutes in the oven the coatings have dried to an appropriate B stage.

A B-staged resin coated crossband with a greenness of 15-20% and a volatile content of 5-7% is particularly suitable for hot pressing multi-ply furniture panels.

Similar results are obtained with unplasticized resin with or without catalyst, as well as with other resins such as urea-formaldehyde condensations. Phenolic resins are also suitable but tend to be quite dark in color and therefore undesirable for light-colored panels. The n-butanol can be omitted but helps in dissolving the resins.

Obviously many modifications and variations of the present invention are possible in the light of the above teachings. It is therefore to be understood that within the scope of the appended claims the invention may be practiced otherwise than as specifically described.

What is claimed is:

1. In the process of hot pressing layers of natural or reconstituted wood together with a crossband sheet that reduces telegraphing, sand-through, checking and splitting of the face, the improvement according to which before the hot pressing the crossband sheet is a vulcanized fiber sheet both surfaces of which adherently carry dried adhesive.

2. The combination of claim 1 in which the adhesive is an incompletely set thermosetting resin.

3. The combination of claim 2 in which the resin is a melamine-formaldehyde resin.

4. A vulcanized fiber sheet about 10 to about 30 mils thick, adherently coated on both sides with a dry B-staged resin that upon hot pressing bonds to natural or reconstituted wood.

5. The combination of claim 4 in which the resin is a melamine-formaldehyde resin.

6. The combination of claim 4 in which the sheet is a laminate of vulcanized fiber plies.

7. The combination of claim 4 in which the sheet is pigmented to match the color of face veneer.

8. In the process of crossbanding a wooden article molded from a plurality of pieces, the improvement according to which the crossband is the coated sheet of claim 4, and before molding it is cut to the exact size of the article.

9. The process of manufacturing a vulcanized fiber crossband, which process is characterized by the steps of preparing long lengths of a number of plies of felted cellulosic fiber each ply about 6 to about 8 mils thick, overlapping a plurality of those lengths and continuously passing the overlapped set through a vulcanizing treatment that includes a final rinse and drying to form a dried non-porous laminate that does not delaminate, coating both faces of the laminate with a liquid adhesive, and drying the adhesive coatings by passing the liquid-carrying laminate continuously through a dryer in which it is supported about every eight to twelve feet by a series of transverse supporting bars each of which engages not more than about a one-inch length of the wet laminate.

10. The process of claim 9 in which the adhesive is a melamine-formaldehyde adhesive that is converted to its B stage by the final drying.

* * * * *